United States Patent
Rinn et al.

(10) Patent No.: US 6,920,249 B2
(45) Date of Patent: Jul. 19, 2005

(54) METHOD AND MEASURING INSTRUMENT FOR DETERMINING THE POSITION OF AN EDGE OF A PATTERN ELEMENT ON A SUBSTRATE

(75) Inventors: Klaus Rinn, Heuchelheim (DE); Wolfgang Fricke, Wetzlar (DE); Joachim Wienecke, Jena (DE)

(73) Assignee: Leica Microsystems Semiconductor GmbH, Wetzlar (DE)

( * ) Notice: Subject to any disclaimer, the term of this patent is extended or adjusted under 35 U.S.C. 154(b) by 676 days.

(21) Appl. No.: 09/960,734

(22) Filed: Sep. 24, 2001

(65) Prior Publication Data

US 2002/0057839 A1 May 16, 2002

(30) Foreign Application Priority Data

Sep. 23, 2000 (DE) .......................................... 100 47 211

(51) Int. Cl.$^7$ ................................................. G06K 9/48
(52) U.S. Cl. .................... 382/199; 250/202; 250/491.1; 250/559.04; 250/559.36; 348/87; 348/94; 356/237.3; 356/238.1; 356/399; 382/144; 382/145; 382/266; 382/283
(58) Field of Search .............................. 250/202, 491.1, 250/559.04, 559.36; 348/87, 94; 356/237.3, 238.1, 399, 495, 501; 382/144, 145, 150

(56) References Cited

U.S. PATENT DOCUMENTS

| | | | |
|---|---|---|---|
| 4,334,241 A | | 6/1982 | Kashioka et al. |
| 4,567,364 A | | 1/1986 | Kano et al. |
| 4,744,662 A | | 5/1988 | Suto et al. |
| 5,109,430 A | | 4/1992 | Nishihara et al. |
| 5,136,661 A | | 8/1992 | Kobayasi et al. |
| 5,375,175 A | | 12/1994 | Kino et al. |
| 5,434,409 A | | 7/1995 | Tsubusaki |
| 5,835,622 A | * | 11/1998 | Koljonen et al. ........... 382/146 |
| 5,987,172 A | * | 11/1999 | Michael ...................... 382/199 |
| 6,061,467 A | * | 5/2000 | Michael ...................... 382/151 |
| 6,363,168 B1 | * | 3/2002 | Kakuma ..................... 382/151 |
| 6,408,109 B1 | * | 6/2002 | Silver et al. ................ 382/300 |
| 6,549,648 B1 | * | 4/2003 | Rinn .......................... 382/151 |

OTHER PUBLICATIONS

*Semi* entitled "Pattern Placement Metrology for Mask Making" by Dr. Carola Blaesing, Mar. 31, 1998.
*SPIE*, vol. 3095 entitled "Advanced Mask Metrology System for up to 4Gbit DRAM" by Taro Ototake et al., pp. 433–444.
*IEEE Transactions on Industrial Electronics*, Vo. 35, No. 1, Feb. 1988 entitled "Subpixel Edge Detection and Estimation with a Micropressor–Controlled Line Scan Camera" by Yu–Shan Li et al., pp. 105–112.
*Malrox Imaging Library User Guide*, Manual No. 10328–MN–0300, Aug. 9, 1995, p. 138.
*tm—Technisches Messen 61*, (1994) 10 entied "Near–Field and Far–Field Scanning Microscopy on Features in the Sub–micrometer Range" by Heinrich Geuther et al., pp. 1–18.
*VDI BERICHTE 659*, Symposium Braunschweig 3, bis No. 6, 1987 entitled "Strukturbreitenmessung mit lichtoptischen Verfahren" by W. Mirandé pp. 319–330.

* cited by examiner

*Primary Examiner*—Bhavesh M. Mehta
*Assistant Examiner*—Gregory Desire
(74) *Attorney, Agent, or Firm*—Crowell & Moring LLP

(57) ABSTRACT

A method and a measuring instrument for determining the position of an edge to be measured on a pattern on a substrate are described. A complete, nonlinear model intensity profile, which identifies the edge to be measured, of a model edge is ascertained and stored, and a desired edge position $x_k$ is defined therein with subpixel accuracy. A camera image of the substrate having the edge to be measured is acquired, and a one-dimensional measured intensity profile of the edge to be measured is determined therefrom. The model intensity profile is identified in the measured intensity profile with an indication of its location $x_m$ relative to a reference point. The desired position p of the edge to be measured is determined with subpixel accuracy as $p=x_m+x_k$.

16 Claims, 6 Drawing Sheets

METHOD AND MEASURING INSTRUMENT FOR DETERMINING THE POSITION OF AN EDGE OF A PATTERN ELEMENT ON A SUBSTRATE

CROSS REFERENCE TO RELATED APPLICATIONS

This invention claims priority of the German patent application 100 47 211.7-52 which is incorporated by reference herein.

FIELD OF THE INVENTION

The invention concerns a method and a measuring instrument for determining the position of an edge to be measured of a pattern element on a substrate, in which a one-dimensional measured intensity profile is ascertained from a camera image of the edge, and the position of the edge relative to a reference point is determined therefrom.

BACKGROUND OF THE INVENTION

The pattern elements to be measured are, in particular, opaque or transparent regions on mask surfaces or patterns on wafers that are used for semiconductor manufacture. The pattern elements to be measured have different widths and lengths and are distinguishable, for example, by way of the location, height, and orientation of their edges. In order to indicate the position of a pattern element on the substrate, often the mutually parallel edge locations are measured and the position is indicated as the centerline with respect to the two edges. In the case of a pattern element measurable as to width and length, or that of two intersecting pattern elements, the position is indicated by way of the coordinates of the intersection point of the two centerlines. Edge position determination is of particular significance because measurement errors have a direct impact on the production process. A measurement accuracy on the nanometer scale is therefore demanded by the semiconductor industry.

Measurement of edge positions is accomplished in special coordinate measuring instruments. A measuring instrument suitable for carrying out the known method is described, for example, in the paper of Dr. Carola Bläsing entitled "Pattern Placement Metrology for Mask Making," presented at the Education Program of Semicon Geneva on Mar. 31, 1998.

An example of a typical measuring instrument is described below. The substrate having the pattern element is mounted on a displaceable measurement stage whose position in a measurement plane relative to a reference point can be measured interferometrically. An imaging system is arranged with its optical axis perpendicular to the measurement plane, and images a substrate region having the pattern element onto a detector array in magnified fashion.

The pixels of the detector array are oriented in rows and columns parallel to the axes of an X-Y coordinate system associated with the substrate. The position of the edge of the pattern element is determined, relative to the reference point, in the coordinate system defined on the substrate; the point at which the optical axis of the imaging system strikes the substrate usually serves as the reference point. The detector array is generally oriented in such a way that its center coincides with the reference point. The location of the substrate coordinate system is aligned, using alignment marks, relative to the measurement instrument coordinate system. Usually the edge of the pattern element to be measured is also oriented parallel or perpendicular to the axes of the mask coordinate system, and thus also to the rows and columns of the detector array.

The image, acquired with the detector array, of the pattern element having the edge is analyzed using image-analysis methods. Using a rectangular measurement window generated in software, a specific region of the detector array, i.e. an image area, is selected for measurement. The measurement window is preferably placed transversely to an edge to be measured of the pattern element.

The contrast level of the edge image varies as a function of the resolution and imaging quality of the imaging system. The best contrast is set using a TV autofocus system. Within a measurement window, the intensities of the pixels lying in one particular row or column parallel to the edge of the pattern element are averaged. This yields an intensity profile of the edge image, perpendicular to the edge, over one row or column of pixels. This intensity profile illustrates the intensity as a function of the location in the measurement direction that is defined perpendicular to the edge.

The location of the edge is defined, for example, by means of a predetermined parameter of the aforesaid intensity profile, for example at 50% of maximum intensity. The interpolated pixel row or pixel column on which the edge is located relative to the reference point is indicated as the resulting edge location. The edge position is thus determined with pixel accuracy.

Determination of the edge location in the calculated intensity profile is of particular importance. In known methods, an edge is assumed to exist in the region of an intensity profile that exhibits a sharp rise or fall in intensity. In this region, a straight-line fit is performed with the individual values of the intensity profile. The problem is that depending on the length of the fitted region and the consequently varying number of individual intensity profile values used for the straight-line fit, the fit can assume different slopes. With different slopes, however, the parameter for determination of the edge position—which is located, for example, at 50% of the maximum intensity—is located at different points, i.e. pixels which correspond to a specific position on the substrate. Calculation of the straight-line fit therefore already constitutes a considerable error in edge determination.

Another problem results from the fact that the measured curve shape of the intensity profile depends, among other factors, on the width and height of the patterns and on the imaging aperture. With optical image acquisition, for example, it is advantageous if the illumination aperture is small compared to the observation aperture. This yields maximum steepness of the intensity profile at the location of the edge, so the position is better defined. Overshoots then occur in the profile, however.

With very narrow patterns, shadow lines of the pattern occur in the intensity profile and supply additional minima that coincide when the pattern lines are particularly narrow (e.g. on wafers). With the straight-line fit method, only the positions of the outer boundaries of the shadow lines can be determined, but a reliable determination of the position of the actual edges of the pattern element is not possible.

U.S. Pat. No. 5,136,661 describes a method for determining edge position. The method defines, for the edge being sought, a straight line with a defined slope. From the image of the pattern, an intensity profile is determined in known fashion, and a measured straight-line fit is calculated therein for each edge contained in it. A variety of evaluation variables are calculated; these are used to select the edge whose measured straight-line fit exhibits the least deviation from the model edge. Selection of the most similar edge is, however, very complex and calculation-intensive. In some cases it requires prior knowledge of the existing pattern widths (e.g. reference widths from the manufacturing process). In addition, the determination of edge position is made with only pixel accuracy, and the problem described above of the straight-line fit on critical intensity profiles remains unresolved.

SUMMARY OF THE INVENTION

It is therefore the object of the invention to describe a method for determining the position of an edge of a pattern element on a substrate which makes possible, on any desired patterned edges, very precise, rapid, and reproducible measurements of the edge position with subpixel accuracy, i.e. to an accuracy of a few nanometers.

This object is achieved by a method for determining the position of an edge to be measured of a pattern element on a substrate in which a one-dimensional measured intensity profile is ascertained from a camera image of the edge and the position of the edge relative to a reference point is determined therefrom; and which according to the present invention is characterized by the following method steps:

a) ascertaining and storing a complete, nonlinear model intensity profile, which identifies the edge to be measured, of a model edge;
 b) defining with subpixel accuracy a desired model edge position $x_k$ in the model intensity profile;
 c) acquiring a camera image, made up of pixel rows and pixel columns, of the edge to be measured;
 d) placing a measurement window onto the camera image transversely over the edge;
 e) determining from the image signals of the pixels of the measurement window a one-dimensional measured intensity profile of the edge;
 f) identifying the model intensity profile in the measured intensity profile with an indication of its location $x_m$ relative to a reference point; and
 g) determining with subpixel accuracy the position p, referred to said reference point, of the edge to be measured, as $p=x_m+x_k$.

A further object of the invention is to describe a measuring instrument for determining the position of an edge to be measured on a pattern on a substrate with which, on any desired patterned edges, very precise, rapid, and reproducible measurements of the edge position can be performed with subpixel accuracy, i.e. to an accuracy of a few nanometers.

This object is achieved by way of a measuring instrument for determining the position of an edge to be measured of a pattern on a substrate which comprises an incident illumination device, an imaging device, a camera for acquiring a camera image of the edge to be measured, a horizontally X-Y displaceable measurement stage for receiving the substrate, means for placing a rectangular measurement window onto the camera image transversely over the edge, means for determining from the image signals of the pixels of the measurement window a one-dimensional measured intensity profile of the cross section of the edge, and means for determining the position p of the edge relative to a reference point, having the following features:

a) means for ascertaining and storing a complete, nonlinear model intensity profile, which identifies the edge to be measured, of a model edge;
 b) means for defining with subpixel accuracy a desired edge position $x_k$ in the model intensity profile;
 c) means for identifying the model intensity profile in the measured intensity profile with an indication of its location $x_m$ relative to a reference point; and
 d) means for determining with subpixel accuracy the position p, referred to said reference point, of the edge to be measured, as $p=x_m+x_k$.

The dependent claims recite advantageous embodiments.

The invention is based on the idea of employing an edge of the best possible production-engineering quality as a model edge for detecting and measuring further edges of the same type. A model intensity profile of this model edge is generated, and in that profile a desired model edge position $x_k$ is defined with subpixel accuracy. It is also possible to use a mathematically simulated model intensity profile. This can be, for example, a multidimensional fit function to real measured values of the model edge.

A camera image is acquired of a substrate having pattern elements whose edges are to be measured. In the camera image, a measurement window is placed (preferably transversely) over an edge to be measured, and a measured intensity profile is determined therefrom.

According to the present invention, the model intensity profile is identified in this measured intensity profile and its position $x_m$ relative to a reference point is determined. The model edge position relative to the reference point can thereby also be indicated. It is identical to the desired position $p=x_m+x_k$, relative to the reference point, of the edge to be measured.

The method offers the advantage that a determination of the edge position is made only for those edges for whose measured intensity profiles a matching model intensity profile is found. It is thereby possible to measure even substrates, e.g. semiconductor masks, that have differing patterns and differing edge types. For that purpose, the respective characterizing model intensity profiles having the desired model edge positions are ascertained for the various edge types and stored. Upon measurement of the real edges that are to be measured, the particular matching model intensity profile can then be determined and allocated, and the desired positions of all the edges to be measured can be ascertained with subpixel accuracy. This also makes possible automatic measurement of pattern elements on masks or wafers.

In order to identify the model intensity profile in the measured intensity profile, in an advantageous embodiment of the method the model intensity profile is, in mathematical fashion, displaced virtually in one-pixel steps relative to the measurement intensity profile, and a determination is made of the position in which the congruence between the model intensity profile and measured intensity profile is maximal.

For that purpose a correlation value $K_j$ is determined, as an indication of the congruence between the model intensity profile and the measured intensity profile, for all the notional positions $x_j$ assumed in the context of the individual pixel steps. The following formula can be used for determination of the correlation values $K_j$:

$$K_j = \frac{N \sum_{i=1}^{N} (P_{i+j} M_i) - \left(\sum_{i=1}^{N} P_{i+j}\right)\left(\sum_{i=1}^{N} M_i\right)}{\sqrt{\left(N \sum_{i=1}^{N} (P_{i+j})^2 - \left(\sum_{i=1}^{N} P_{i+j}\right)^2\right)\left(N \sum_{i=1}^{N} M_i^2 - \left(\sum_{i=1}^{N} M_i\right)^2\right)}}$$

in which:
P=Intensity value of a pixel of the measured intensity profile;

M=Intensity value of a pixel of the model intensity profile; i=1 . . . N=Pixels of the model intensity profile.

For the respective instantaneous notional position $x_j$, j indicates that pixel in the measured intensity profile at which the first pixel i=1 of the model intensity profile lies on the measured intensity profile.

The highest correlation value $K_j$ indicates the best congruence. High correlation values $K_j$ can, however, also be generated by noise components of the measured intensity profile if their curve is described by the model intensity profile.

According to the present invention, for that purpose the high correlation values $K_j$ that were caused by intensity curves in the noise are excluded from further evaluation.

The correlation values $K_j$ can be evaluated in various ways. For example, a correlation function K(x) can be prepared from the discrete correlation values $K_j$, and its maxima can be determined.

For that purpose, either the correlation curve K(x) itself is examined for maxima, the local maxima caused by noise being rejected. From the remaining maximum $x_m$ associated with the desired edge, the position of the edge to be measured is determined as $p=x_m+x_k$.

Or the derivative ΔK(x) of the correlation curve K(x) is determined and its zero points are determined, the zero points caused by noise being rejected. From the remaining zero point $x_m$ associated with the desired edge, the position of the edge to be measured is determined as $p=x_m+x_k$.

It is also possible to evaluate the correlation values directly, i.e. without preparing a correlation curve. This is done by defining a lower limit value for the correlation values that are to be evaluated. For those correlation values that exceed the limit value, at least one local parabolic fit is prepared. If several groups of correlation values lie above the limit value, several parabolic fits are prepared. The local maxima of the parabolic fits are determined with subpixel accuracy. Those local maxima that are caused by intensity curves in the noise are rejected. From the remaining local maximum $x_m$ caused by the edge to be measured, the desired edge position p is determined as $p=x_m+k$.

In another variant of the method, the gradients $\Delta K_j=K_j-K_{j+1}$ are determined for each correlation value $K_j$. A straight-line fit is then calculated in the vicinity of all possible zero points, the straight-line fit being accomplished in each case with a group of $\Delta K_j$ of which at least one value $\Delta K_j$ is greater than zero and one less than zero. The zero points of the straight-line fit are determined, and those zero points that were caused by intensity curves in the noise are rejected. From the remaining zero point $x_m$ that was caused not by the noise but by the edge to be measured, the desired edge position p is determined as $p=x_m+x_k$.

In a further embodiment of the method, local parabolic fits are determined in the vicinity of those discrete correlation values $K_j$ whose adjacent correlation values $K_{j-1}$ and $K_{j+1}$ have lower values. The local maxima of the local parabolic fits are determined with subpixel accuracy. Those local maxima that were caused by intensity curves in the noise are then rejected prior to further evaluation. From the remaining maximum $x_m$ that was caused by the edge to be measured, the desired edge position p is determined as $p=x_m+X_k$.

With the method described it is possible to perform a determination, on a pattern element whose right and left edges are mirror images of one another, of the positions of both edges using only one previously known model intensity profile. For example, if a model intensity profile that can identify the left edge is defined, then first the left edge is found using the method already described, and its position is determined with subpixel accuracy. Then the model intensity profile is mirror-reflected so that a second model intensity profile identifying the right edge is formed. With this second model intensity profile, the right edge (which is symmetrical to the left edge) is then found and its position is determined with subpixel accuracy.

Further advantageous applications are evident from the method according to the present invention.

For example, a substrate having multiple edges to be measured can be measured by ascertaining and storing, for different model edges, multiple different nonlinear model intensity profiles which identify the different edge types. In each individual model intensity profile, a desired edge position $x_k$ is defined with subpixel accuracy. At least one measured intensity profile is then ascertained for the substrate having multiple edges to be measured. The various model intensity profiles are identified in the measured intensity profile; for each model intensity profile found in the measured intensity profile, its position $x_m$ relative to the reference point is indicated. The position p of each edge identified by means of its associated model intensity profile is determined with subpixel accuracy as $p=x_m+x_k$.

In a further embodiment of the method, once again multiple different nonlinear model intensity profiles for different model edges are ascertained and stored. The desired edge position $x_k$ in each individual one of the model intensity profiles is defined with subpixel accuracy. A one-dimensional measured intensity profile is ascertained for a substrate that has an edge to be measured whose model intensity profile was previously determined. The correct model intensity profile associated with the edge to be measured is ascertained from the plurality of previously ascertained model intensity profiles in the measured intensity profile; for the model intensity profile found in the measured intensity profile, its position $x_m$ relative to the reference point is indicated. The position p of the edge identified by means of its associated model intensity profile is calculated with subpixel accuracy as $p=x_m+x_k$.

The method according to the present invention makes it possible to measure the position of the edges of pattern elements even under difficult boundary conditions, for example very narrow patterns or patterns located very close to one another that result in complex measured intensity profiles. Position determination can be made reliably and with subpixel accuracy.

BRIEF DESCRIPTION OF THE DRAWINGS

An exemplary embodiment of the invention will be explained in more detail below with reference to the schematic drawings, in which.

DETAILED DESCRIPTION OF THE INVENTION

Figure 1:
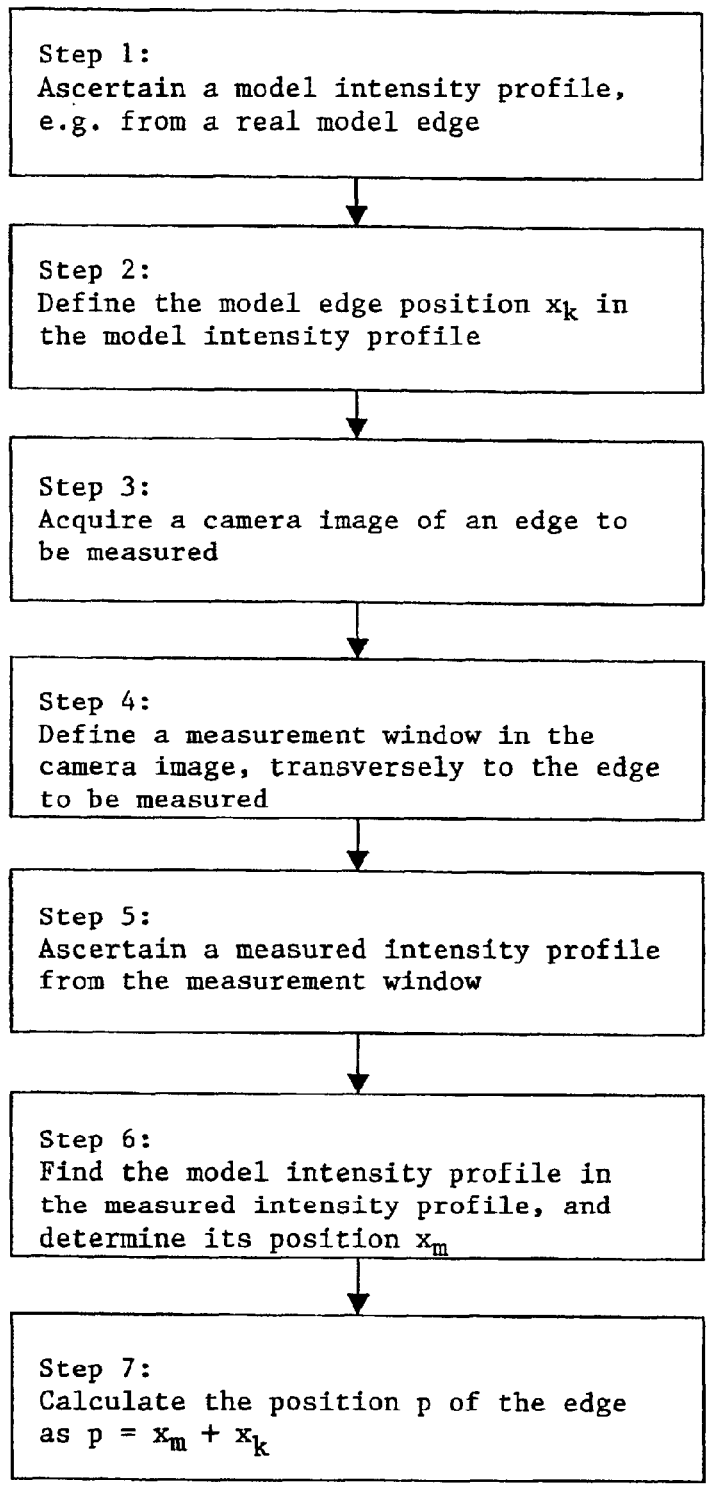
FIG. 1 shows a flow chart of the method according to the present invention.

FIG. 1 shows a flow chart of the method according to the present invention. It comprises seven method steps that are described below.

In a first step of the method according to the present invention, a complete, nonlinear model intensity profile, which identifies the edge to be measured, of a model edge is ascertained and stored.

The model intensity profile can be ascertained in various ways.

One possibility is to measure an intensity profile of a real model edge and take a partial profile area of the measured intensity profile as the model intensity profile.

For that purpose, first a camera image, comprising pixels arranged in rows and columns, is acquired of a model substrate that comprises a model edge whose parameters correspond to those of the edges being measured. The optical measurement parameters used must be the same as those to be used subsequently upon measurement of the edge to be measured that is identifiable by way of the model edge. This ensures that the intensity profiles acquired of identical edges are also identical (or approximately identical).

A rectangular measurement window is placed onto the camera image of the model substrate, and a one-dimensional intensity profile of the model substrate is ascertained from the image signals of the pixels of the measurement window. From this intensity profile, a nonlinear partial profile area that identifies the model edge is taken as the model intensity profile and stored.

In addition, it is possible to prepare a polynomial fit to the model intensity profile thus ascertained, and to use the values of the polynomial fit for calculation of the correlation values $k_j$.

Another possibility for determining a model intensity profile consists in generating the model intensity profile of the model edge not by measurement, but by mathematical simulation. For example, a polynomial fit to the model intensity profile of the model edge can be prepared, and the values of the polynomial fit used to calculate the correlation values $k_j$. For the preparation of usable simulation calculations, however, this method requires very accurate knowledge of the edges that are later to be measured, their substrate, and the measurement optics.

In a second step of the method, a desired edge position $x_k$ is defined with subpixel accuracy in the model intensity profile. In other words, the desired edge position can be selected at any desired point in the model intensity profile without consideration of the pixel width. For example, the model intensity profile can be displayed in magnified fashion on a monitor of a computer. The desired edge position in the model intensity profile can then be arrived at by displacing a cursor and selected, for example by clicking with a computer mouse.

In a third step of the method, a camera image of the edge to be measured, made up of pixel rows and pixel columns, is acquired.

In a fourth step of the method, a measurement window is placed onto the camera image transversely over the edge. The measurement window defines a portion of the camera image, containing the edge to be measured, from which the one-dimensional measured intensity profile is ascertained. The measurement window can be implemented either with hardware (e.g. by way of an optical or electronic window or an image area, or by zooming the camera), or using software. The measurement window is preferably rectangular, and is oriented with its longer side perpendicular to the edge being measured.

In a fifth step of the method, a one-dimensional measured intensity profile of the edge is determined from the image signals of the pixels of the measurement window. A variety of methods, which depend inter alia on the alignment of the measurement window on the substrate or in the camera image, are known for determination of the one-dimensional measured intensity profile.

For example, if the pixel columns of the measurement window extend in the longitudinal direction of the edge to be measured, determination of a one-dimensional measured intensity profile is accomplished in the row direction by adding the column pixel values.

If, however, the pixel rows of the measurement window extend in the longitudinal direction of the edge to be measured, determination of a one-dimensional measured intensity profile is accomplished in the column direction by adding the row pixel values.

In addition, an averaging of the intensity values can be performed when the intensity profile is determined. For example, if the pixel rows of the measurement window extend in the longitudinal direction of the edge to be measured, determination of a one-dimensional measured intensity profile is accomplished in the column direction by adding and averaging the row pixel values.

If, however, the pixel columns of the measurement window extend in the longitudinal direction of the edge to be measured, determination of a one-dimensional measured intensity profile is accomplished in the row direction by adding and averaging the column pixel values.

In a sixth step of the method, the model intensity profile is identified in the measured intensity profile, indicating its location $x_m$ relative to a reference point. For example, the location $x_m$ of the model intensity profile is indicated by the position of the first pixel of the model intensity profile in the measured intensity profile.

In a variant of the method, for identification of the model intensity profile in the measured intensity profile, the model intensity profile is, for example, displaced in computational fashion in steps, i.e. pixel by pixel, over the measured intensity profile to virtual positions. For each virtual position j, a correlation value $K_j$ is determined as an indication of the quality of the congruence between model intensity profile and measured intensity profile.

The virtual positions having maximal correlation values may be considered locations at which the model intensity profile is congruent with the measured intensity profile, and from which the position of the edge to be measured can be determined. When the selection is made, those maxima of the correlation values that are caused by noise must be rejected.

One possibility is to determine a maximum value for the intensity of the noise of the correlation values $K_j$ and to associate with it a correlation limit value $K_{min}$; and to reject, before determination of the desired edge position p, those local maxima that lie below that correlation limit value $K_{min}$.

A further possibility is to determine from the correlation values $K_j$ a correlation function $K(x)$, and to calculate its derivative and the zero points of the derivative. A maximum value for the intensity of the noise of the correlation values $K_j$ is then determined, and a correlation limit value $K_{min}$ is associated with it. Before determination of the desired edge position p, those zero points whose associated values of the correlation function K(x) lie below that correlation limit value $K_{min}$ are then rejected.

In a seventh step of the method, the position p of the edge to be measured is determined, as $p=x_m+x_k$, with subpixel accuracy. The position p of the edge is obtained with subpixel accuracy because the position $x_k$ of the model edge in the model intensity profile is defined arbitrarily with subpixel accuracy.

Figure 2:
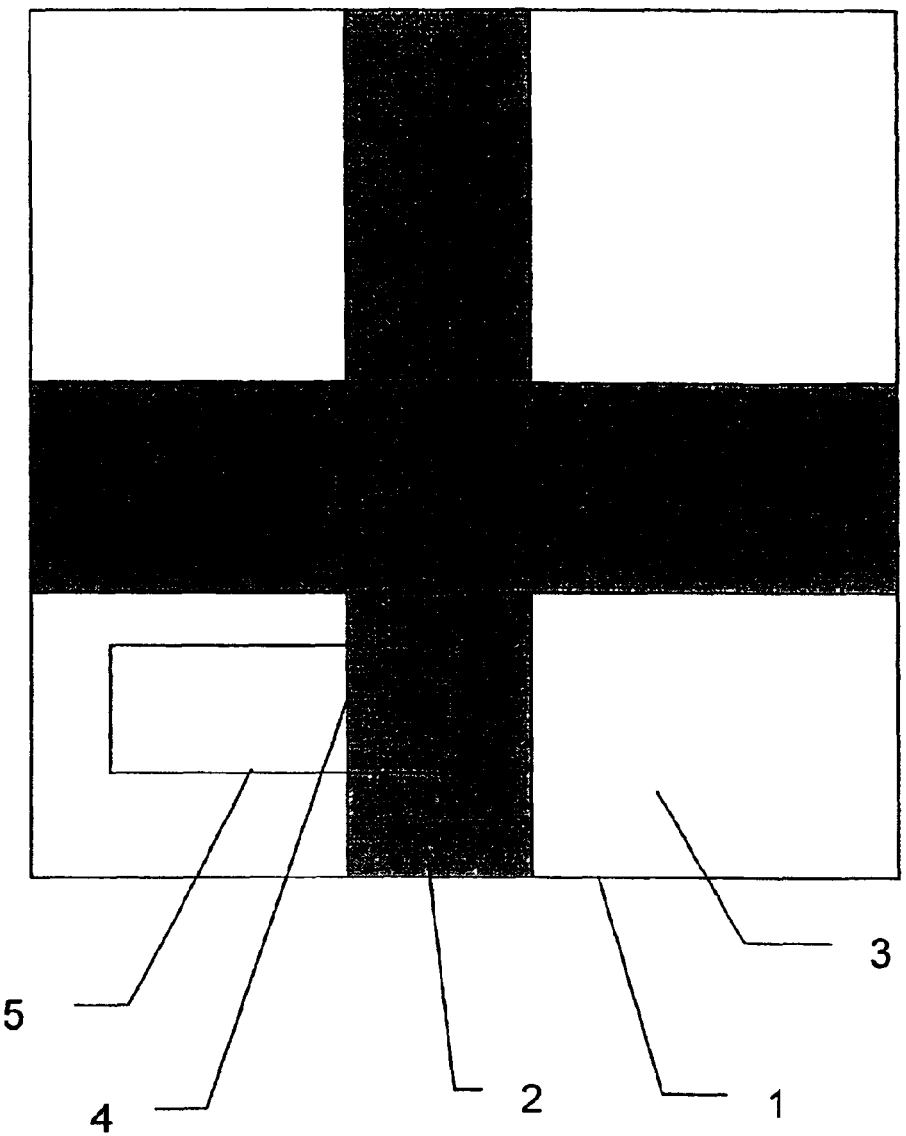
FIG. 2 shows a schematic camera image of a pattern element having a model edge.

FIG. 2 shows, as an example, a schematic camera image 1 of a model pattern 2 which appears in camera image 1 as two intersecting dark bars against a bright background (i.e. substrate 3). Substrate 3 can be, for example, a wafer or the glass substrate of a semiconductor mask. In this example the left edge of the vertical bar of model pattern 2 is used as model edge 4. A measurement window 5 is arranged transversely to model edge 4 in camera image 1. The camera image is composed of pixels (not depicted) that are arranged in rows and columns.

Figure 3:
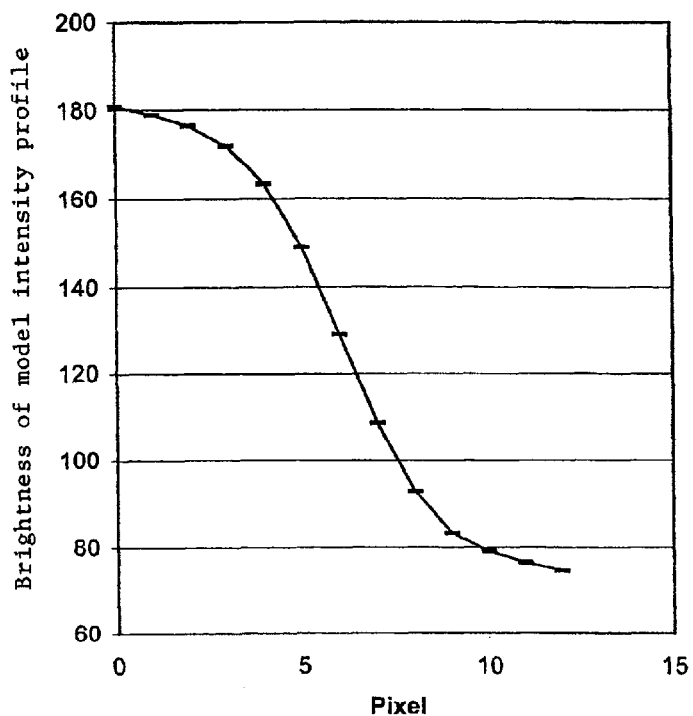
FIG. 3 shows a model intensity profile derived from the model edge.

FIG. 3 shows a model intensity profile, derived from model edge 4 of FIG. 2, that was calculated from the pixels of measurement window 5. The model intensity profile has in the left portion high intensity values that result from the bright background, i.e. substrate 3. In the right portion the model intensity profile has low brightness values that were caused by the vertical dark bar of model pattern 3. In the middle portion, the model intensity profile has a slope, i.e. a decrease in intensity values. The position of model edge 4 lies in the region of this slope. From production parameters of model pattern 3, from previous comparative measurements, and from mathematical considerations, it is now possible to define a reference value for the position of model edge 4.

Figure 4:
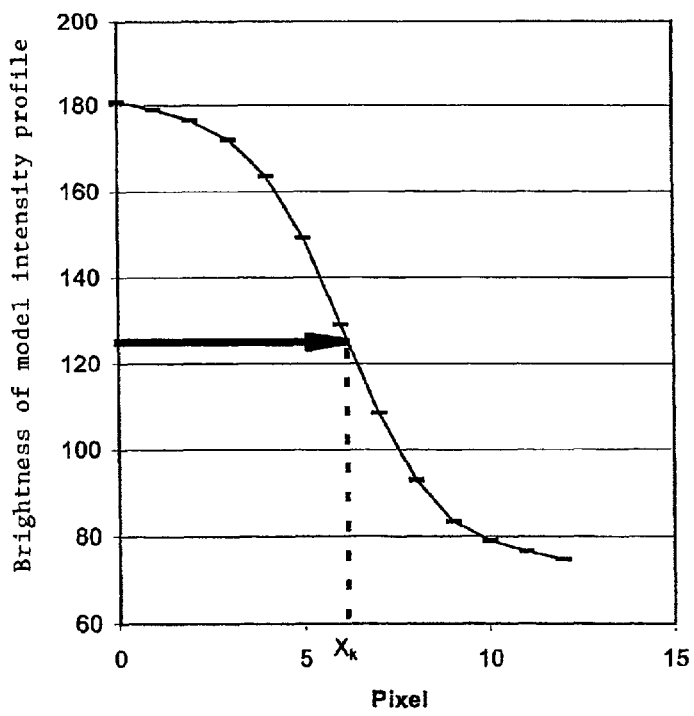
FIG. 4 shows a model intensity profile with a defined model edge position $x_k$.

FIG. 4 shows the model intensity profile of FIG. 3 with such a defined edge position $x_k$ of model edge 4. This is used in the method according to the present invention for determination of the edge position on real edges that have not yet been measured.

Figure 5:
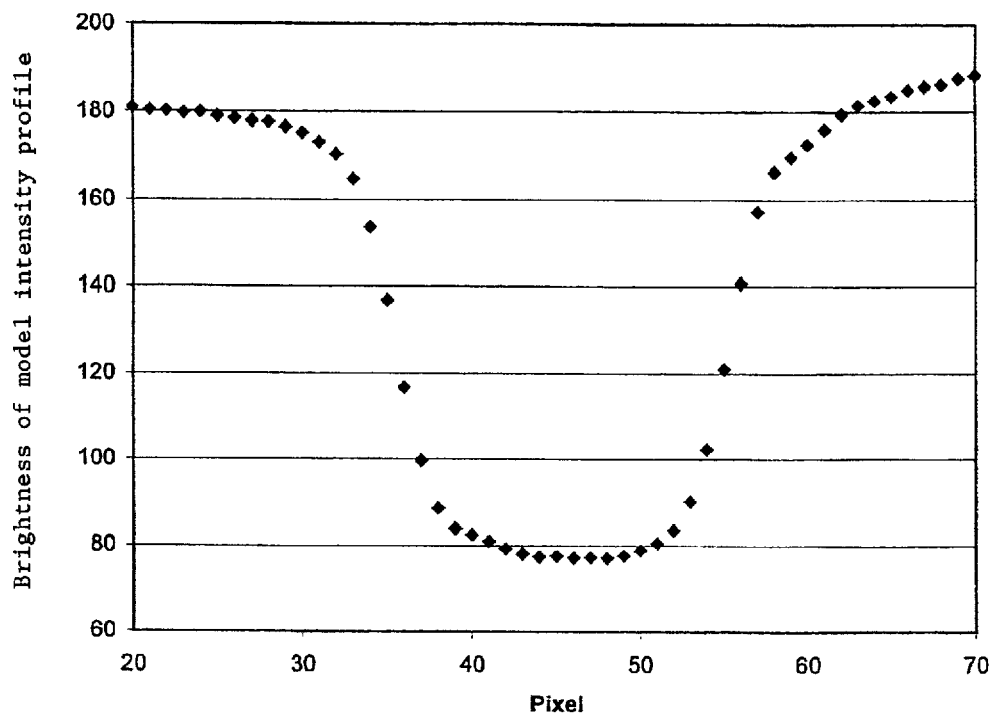
FIG. 5 shows a measured intensity profile of a real edge to be measured of a pattern element.

FIG. 5 shows a measured intensity profile that was ascertained on a real edge to be measured of a pattern element. For that purpose, a camera image of the edge to be measured was acquired, and a rectangular measurement window was placed on the camera image transversely over the edge. A one-dimensional measured intensity profile of the cross section of the edge was then calculated from the image signals of the pixels of the measurement window.

Figure 6:
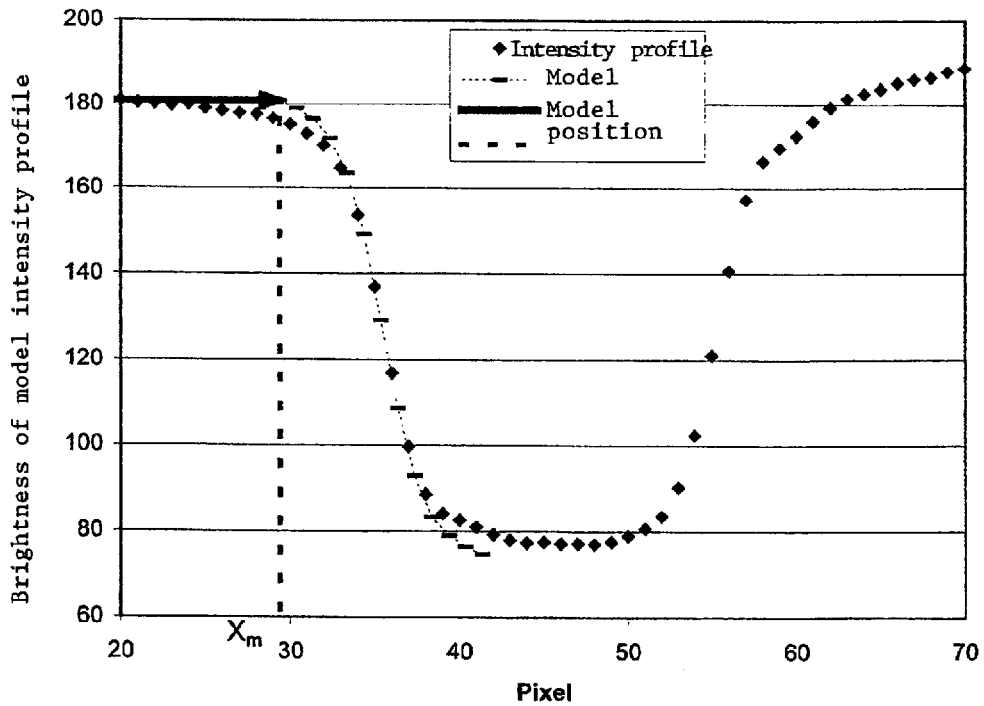
FIG. 6 shows the position of the identified model intensity profile in the measured intensity profile.

FIG. 6 shows the position $x_m$ of the identified model intensity profile in the measured intensity profile. Stated graphically, for this purpose the model intensity profile was displaced in one-pixel steps over the measured intensity profile, and the location of the greatest congruence was determined. Stated mathematically, a correlation value was determined for each position assumed by the model intensity profile. The position of the model intensity profile in the measured intensity profile then corresponds to the pixel value having the greatest correlation value (correlation value maxima caused by noise already having been left out of consideration).

Figure 7:
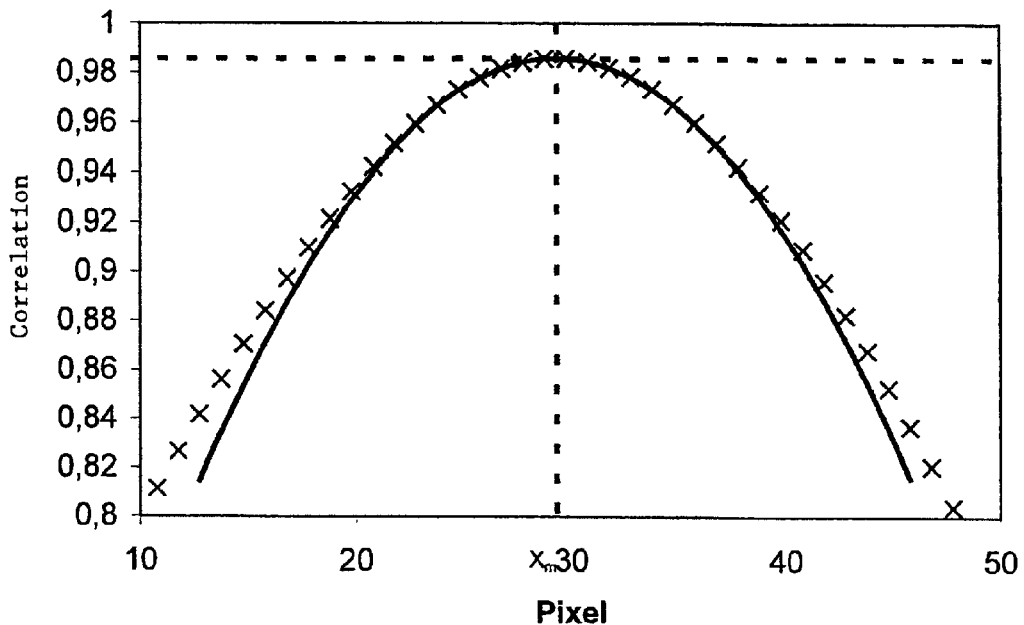
FIG. 7 shows the determination of the edge position in the measured intensity profile.

FIG. 7 shows for this purpose, as an example, a parabolic fit (shown as a solid line) through discrete correlation values at specific pixels. Each ascertained discrete correlation value is depicted as a small cross. The crosses are therefore arranged at the spacing of the pixels. The maximum of the parabolic fit is determined as the location of the best correlation. The ascertained maximum value $K_{max}$ of the correlation values lies between two pixels. From the parabolic fit, its position $x_m$ can be determined with subpixel accuracy.

Figure 8:
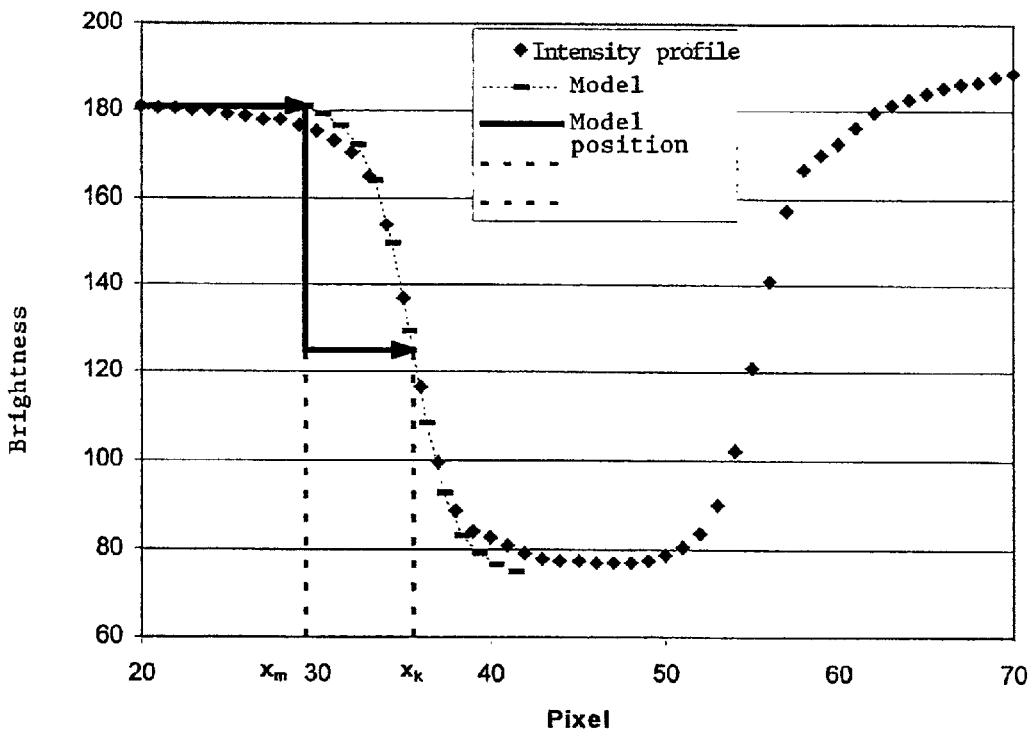
FIG. 8 shows a parabolic fit using discrete correlation values.

FIG. 8 shows the edge position $p=x_m+x_k$, ascertained according to the present invention, of the edge to be measured in the measured intensity profile. Since the position $x_k$ of the model edge in the model intensity profile was defined previously, it could be used to find the position p of the actually desired edge.

Figure 9:
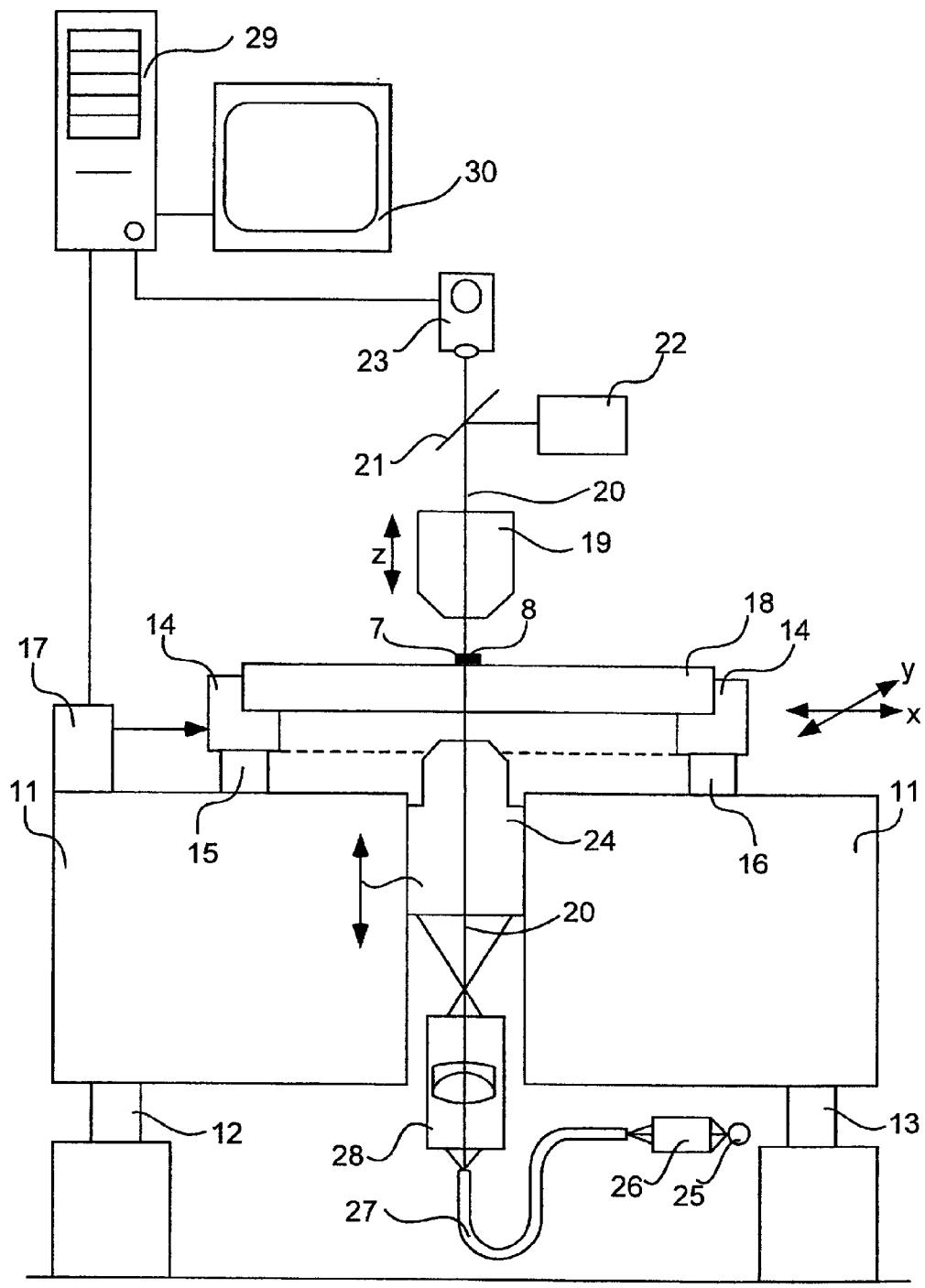
FIG. 9 shows a measuring instrument for determining the position of an edge to be measured of a pattern element on a substrate.

FIG. 9 shows a measuring instrument 6 for determining the position of an edge to be determined of a pattern element.

Measuring instrument 6 comprises a granite block 11 that is mounted on vibration dampers 12, 13. On granite block 11, a measurement stage 14 configured as a frame is slidingly displaceable in the X and Y directions (indicated in the drawing by two arrows) on air bearings 15, 16. The frame of measurement stage 14 is advantageously made of a glass ceramic with a low coefficient of thermal expansion. The drive elements for displacing measurement stage 14 are not depicted. The position of measurement stage 14 is measured in the X and Y directions with a laser interferometer system 17.

A mask 18 is set into the frame of measurement stage 14. Mask 18 is made, for example, of quartz glass. Applied on the mask surface is a pattern element 9 having an edge 7 to be measured, whose position is to be determined. Since measurement stage 14 is configured as a frame, mask 8 can also be transilluminated from below.

Located above mask 18, as the illumination system, is an objective 19 of high optical quality that is adjustable in the Z direction along its optical axis 20 for focusing. Optical axis 20 defines the reference point for measuring the relative position of edge 7.

By way of a splitter mirror 21, on the one hand the light of an incident-light light source 22 is introduced into the optical beam path, and on the other hand the imaging rays are directed onto a camera 23. Incident-light light source 22 emits, for example, in the near UV spectral region. By means of camera 23, an image of edge 7 of pattern element 8 is acquired, and from it the position of edge 7 is determined as coordinates on mask 18. A CCD camera having a high-resolution pixel array is used, for example, as the camera. Other high-resolution detector devices can, however, also be used, provided it is possible to determine from their image signals an intensity profile for a measurement window within the camera image.

Set into granite block 11 is a further illumination device that comprises an adjustable-height condenser 24 and a transmitted-light light source 25. The optical axis of condenser 24 aligns with optical axis 20 of objective 19. The light of transmitted-light light source 25 is coupled by means of a coupling-in optical system 26 into an optical waveguide 27. The light emerging from optical waveguide 27 is taken out of optical waveguide 27 by means of a coupling-out optical system 28, and emitted into condenser 24.

The height adjustability of condenser 24 with transmitted-light light source 25 is used to adapt the illuminating beams to be directed onto pattern element 8 to different optical thicknesses of masks 18. The head of condenser 24 can, in particular, extend into the open frame of measurement stage 14. To prevent damage in the context of stage displacements over the entire mask surface, however, condenser 24 can also be withdrawn below the surface of granite block 11. Light sources 22 and 25 can be switched on independently of one another.

Associated with measuring instrument 6 is a computer 29 that is connected to camera 23 and to laser interferometer system 17. A monitor 30 is also connected to computer 29. Monitor 30 serves to display the image acquired with camera 23. A computer program that controls and executes the method steps for measuring the position of edge 7 is installed on computer 29.

The embodiment described above of a measuring instrument for determining the position of edge 7 to be measured offers the possibility of illuminating and measuring with either incident or transmitted light. It is, of course, also possible to equip an apparatus only with an incident-light illumination system or only with a transmitted-light illumination system.

A measurement of the position of edge 7 using measuring instrument 6 will be described below.

Before the actual determination of the position of edge 7 to be measured of pattern element 8, in a first method step firstly a complete, nonlinear model intensity profile, which identifies edge 7 to be measured, of a model edge is ascertained and stored. In the present case an intensity profile of a real model edge of a model pattern (not depicted) was measured, and a partial profile region of the ascertained intensity profile was taken as the model intensity profile.

For that purpose, firstly a camera image, made up of pixel rows and pixel columns, is acquired of the model edge from a model substrate (not depicted) having a model edge. The optical measurement parameters used are the same as those to be used upon measurement of edge 7 to be measured that is identifiable by way of the model edge. The use of the same optical measurement parameters ensures that the intensity profiles acquired of identical edges are also identical (or approximately identical).

The image signals of the camera image are transferred from camera 23 to computer 29. A rectangular measurement window is placed onto the camera image of the model substrate by means of the computer program or by a user. The actual image area can be implemented either with hardware (e.g. by way of an optical or electronic window or an image area, or by zooming the camera), or by means of a computer program, by selecting from the data of the image signals. The measurement window is preferably rectangular, and is oriented with its longer side perpendicular to the edge being measured.

A one-dimensional measured intensity profile of the edge is ascertained by means of the computer program from the image signals of the pixels of the measurement window. From this intensity profile, a nonlinear partial image area that identifies the model edge is taken as the model intensity profile and stored.

In a second step of the method, a desired edge position $x_k$ is defined with subpixel accuracy in the model intensity profile. This can be accomplished by a user, or automatically by means of a function of the computer program in computer 29. The desired ideal edge position can be selected, without consideration of the pixel width, at any arbitrary point on the model intensity profile. For example, the model intensity profile can be displayed in magnified fashion on monitor 30. A user can then arrive at the desired edge position in the model intensity profile by displacing a cursor on monitor 30, and select it, for example by clicking with a computer mouse or another cursor control apparatus (not depicted).

In a third step of the method, as depicted in the Figure, mask 18 is placed onto measurement stage 14. Camera 23 is then used to acquire a camera image of edge 7 to be measured, made up of pixel rows and pixel columns.

In a fourth step of the method, a measurement window is placed transversely over the edge in the camera image depicted on monitor 30. The measurement window defines a portion of the camera image containing edge 7 to be measured. As already described with reference to creation of the model intensity profile, the measurement window can be defined by a user or by the computer program.

In a fifth step of the method, computer 29 calculates from the image signals of the pixels of the selected measurement window, using the computer program, a one-dimensional measured intensity profile of edge 7. The measured intensity profile describes the intensity curve in the camera image of edge 7, transversely to said edge 7.

In a sixth step of the method, the point in the measured intensity profile at which the model intensity profile appears or is contained is ascertained with computer 29 by means of the computer program. In other words, the model intensity profile is identified and localized in the measured intensity profile. The location $x_m$ of the model intensity profile in the measured intensity profile is determined relative to a reference point, e.g. optical axis 20. For example, the point (indicated by the pixel value) in the measured intensity profile at which the first pixel of the model intensity profile appears can be indicated as the location $x_m$ of the model intensity profile.

In a seventh step of the method, the position p of the edge to be measured is determined by the computer by means of the computer program. It is obtained by adding the location $x_m$ of the model intensity profile in the measured intensity profile relative to a reference point and the position $X_k$ of the model edge in the model intensity profile, as $p=x_m+x_k$. The position p of the edge is obtained with subpixel accuracy because the selection of the position $x_k$ of the model edge in the model intensity profile was performed arbitrarily with subpixel accuracy.

The present invention was described with reference to exemplary embodiments. It is nevertheless apparent to any person skilled in this art that changes and modifications can be made without thereby leaving the range of protection of the claims recited hereinafter.

Parts List

1 Camera image
2 Model pattern
3 Substrate
4 Model edge
5 Measurement window
6 Measuring instrument
7 Edge
8 Pattern element
11 Granite block
12 Vibration damper
13 Vibration damper
14 Measurement stage
15 Air bearing
16 Air bearing
17 Laser interferometer system
18 Mask
19 Objective
20 Optical axis
21 Splitter mirror
22 Incident-light light source
23 Camera
24 Condenser
25 Transmitted-light light source
26 Coupling-in optical system 27 Optical waveguide
28 Coupling-out optical system
29 Computer
30 Monitor

What is claimed is:

1. A method for determining the position of an edge to be measured of a pattern element on a substrate, in which a one-dimensional measured intensity profile is ascertained from a camera image of the edge and the position p of the edge relative to a reference point is determined therefrom, comprising the steps:
   a) ascertaining and storing a complete, nonlinear model intensity profile, which identifies the edge to be measured, of a model edge;
   b) defining with subpixel accuracy a desired model edge position $x_k$ in the model intensity profile;
   c) acquiring a camera image, made up of pixel rows and pixel columns, of the edge to be measured;
   d) placing a rectangular measurement window onto the camera image transversely over the edge;
   e) determining from the image signals of the pixels of the measurement window a one-dimensional measured intensity profile of the edge;
   f) identifying the model intensity profile in the measured intensity profile with an indication of its location $x_m$ relative to a reference point; and
   g) determining with subpixel accuracy the position p, referred to said reference point, of the edge to be measured, as $p=x_m+x_k$.

2. The method as defined in claim 1, comprising the following further steps:
   a) mathematically and virtually displacing the model intensity profile on the measured intensity profile in one-pixel steps to notional positions $x_j$ (j=pixel index) placed relative to the reference point, pixel j indicating the notional location of the first intensity value of the model intensity profile, and determining a discrete correlation value Kj for each notional position $x_j$ that is assumed;
   b) preparing from the discrete Kj values a correlation function K(x), where $K_j \approx K(x)$ at pixels j;
   c) determining with subpixel accuracy the local maxima of the correlation function K(x);
   d) rejecting those local maxima of the correlation values $K_j$ that were caused by intensity curves in the noise; and
   e) determining the desired edge position p from the remaining local maximum $x_m$ that was caused by the edge to be measured, as $p=x_m+x_k$.

3. The method as defined in claim 2, characterized by calculation of the correlation values $K_j$ in accordance with $$K_j = \frac{N\sum_{i=1}^{N}(P_{i+j}M_i) - \left(\sum_{i=1}^{N}P_{i+j}\right)\left(\sum_{i=1}^{N}M_i\right)}{\sqrt{\left(N\sum_{i=1}^{N}(P_{i+j})^2 - \left(\sum_{i=1}^{N}P_{i+j}\right)^2\right)\left(N\sum_{i=1}^{N}M_i^2 - \left(\sum_{i=1}^{N}M_i\right)^2\right)}}$$

in which
   P indicates an intensity value of a pixel of the measured intensity profile;
   M indicates an intensity value of a pixel of the model intensity profile; and
   i=1 ... N indicates the pixels of the model intensity profile, and in which
   j identifies that pixel in the measured intensity profile at which the first pixel i=1 of the model intensity profile for the respective instantaneous notional position lies on the measured intensity profile.

4. The method as defined in claim 1, comprising the following further steps:
   a) mathematically and virtually displacing the model intensity profile on the measured intensity profile in one-pixel steps to notional positions $x_j$ (j=pixel index) placed relative to the reference point, pixel j indicating the notional location of the first intensity value of the model intensity profile, and determining a discrete correlation value Kj for each notional position $x_j$ that is assumed;
   b) preparing from the discrete Kj values a correlation function K(x), where $K_j \approx K(x)$ at pixels j;
   c) taking the derivative $\Delta K(x)$ of the correlation function K(x) and determining the zero points of the derivative $\Delta K(x)$;
   d) rejecting those zero points that were caused by intensity curves in the noise; and
   e) determining the desired edge position p from the remaining zero point $x_m$ that was caused not by the noise but by the edge to be measured, as $p=x_m+x_k$.

5. The method as defined in claim 1, comprising the following further steps:
   a) mathematically and virtually displacing the model intensity profile on the measured intensity profile in one-pixel steps to notional positions $x_j$ (j=pixel index) placed relative to the reference point, pixel j indicating the notional location of the first intensity value of the model intensity profile, and determining a discrete correlation value Kj for each notional position $x_j$ that is assumed;
   b) preparing one or more local parabolic fits for all discrete $K_j$ values that lie above a defined limit value for the $K_j$ values;
   c) determining with subpixel accuracy the local maxima of the parabolic fits;
   d) rejecting those local maxima that were caused by intensity curves in the noise; and
   e) determining the desired edge position p from the remaining local maximum $x_m$ that was caused by the edge to be measured, as $p=x_m+x_k$.

6. The method as defined in claim 1, comprising the following further steps:
   a) mathematically and virtually displacing the model intensity profile on the measured intensity profile in one-pixel steps to notional positions $x_j$ (j=pixel index) placed relative to the reference point, pixel j indicating the notional location of the first intensity value of the model intensity profile, and determining a discrete correlation value Kj for each notional position $x_j$ that is assumed;
   b) creating the gradient $\Delta K_j = K_j - K_{j+1}$ for each $K_j$ value;
   c) creating a respective straight-line fit in the vicinity of all possible zero points, the straight-line fit being accomplished in each case with a group of $\Delta K_j$ values of which at least one $\Delta K_j$ value is greater than zero and one less than zero;
   d) determining the zero points of the straight-line fits;
   e) rejecting those zero points that were caused by intensity curves in the noise; and
   f) determining the desired edge position p from the remaining zero point $x_m$ that was caused not by the noise but by the edge to be measured, as $p=x_m+x_k$.

7. The method as defined in claim 1, comprising the following further steps:
a) mathematically and virtually displacing the model intensity profile on the measured intensity profile in one-pixel steps to notional positions $x_j$ (j=pixel index) placed relative to the reference point, pixel j indicating the notional location of the first intensity value of the model intensity profile, and determining a discrete correlation value Kj for each notional position $x_j$ that is assumed;
b) preparing one or more local parabolic fits in the vicinity of those discrete correlation values $K_j$ whose adjacent correlation values $K_{j-1}$ and $K_{j+1}$ have lower values; c) determining with subpixel accuracy the local maxima of the parabolic fits; d) rejecting those local maxima that were caused by intensity curves in the noise; and e) determining the desired edge position p from the remaining local maximum $x_m$ that was caused by the edge to be measured, as $p=x_m+x_k$.

8. The method as defined in claim 1, wherein the model intensity profile is ascertained using the following steps:
a) acquiring a camera image, made up of pixels arranged in rows and columns, of a model substrate having a model edge, with the same optical measurement parameters that are to be used subsequently when measuring the edge to be measured that is identifiable by way of the model edge;
b) placing a rectangular measurement window onto the camera image of the model substrate;
c) determining from the image signals of the pixels of the measurement window a one-dimensional intensity profile of the model substrate;
d) taking from that intensity profile, as the model intensity profile, a nonlinear partial area identifying the model edge.

9. The method as defined in claim 1, wherein the model intensity profile is ascertained by mathematical simulation of the model edge.

10. The method as defined in claim 1, wherein measurement of the position of at least two edges that are mirror-symmetrical with respect to one another is accomplished by way of the following method steps:
a) ascertaining and storing a complete, nonlinear first model intensity profile identifying one of said edges;
b) determining the position of at least one edge by means of the first model intensity profile;
c) mirror-reflecting the first model intensity profile and storing the reflected first model intensity profile as a second model intensity profile associated with a notional reflected model edge;
d) determining by means of the second model intensity profile the position of at least one edge that is mirror-symmetrical to those already measured.

11. The method as defined in claim 1, comprising the following steps:
a) ascertaining and storing several different nonlinear model intensity profiles for different model edges;
b) defining a desired edge position $x_k$ with subpixel accuracy in each one of the model intensity profiles;
c) determining a one-dimensional measured intensity profile of a substrate having several edges to be measured whose model intensity profiles have previously been determined;
d) identifying the various model intensity profiles in the measured intensity profile, such that for each model intensity profile found in the measured intensity profile, its position $x_m$ relative to the reference point is indicated; and
e) separately calculating, with subpixel accuracy, the position p of each edge identified by means of its associated model intensity profile, as $p=x_m+x_k$.

12. The method as defined in claim 1, comprising the following steps:
a) ascertaining and storing several different nonlinear model intensity profiles for different model edges;
b) defining a desired edge position $x_k$ with subpixel accuracy in each one of the model intensity profiles;
c) determining a one-dimensional measured intensity profile of a substrate having several edges to be measured whose model intensity profiles have previously been determined;
d) identifying in the measured intensity profile, from among the various model intensity profiles previously ascertained, the correct model intensity profile associated with the edge to be measured, such that for each model intensity profile found in the measured intensity profile, its position $x_m$ relative to the reference point is indicated; and
e) calculating, with subpixel accuracy, the position p of each edge identified by means of its associated model intensity profile, as $p=x_m+x_k$.

13. A measuring instrument for determining the position of an edge (7) to be measured of a pattern element on a substrate (8), which comprises an incident illumination device (10, 13), an imaging device (10), a camera (14) for acquiring a camera image of the edge to be measured, a horizontally X-Y displaceable measurement stage (4) for receiving the substrate (8), means for placing a rectangular measurement window onto the camera image transversely over the edge, means for determining from the image signals of the pixels of the measurement window a one-dimensional measured intensity profile of the cross section of the edge, and means for determining the position p of the edge relative to a reference point, characterized by:
a) means for ascertaining and storing a complete, nonlinear model intensity profile, which identifies the edge to be measured, of a model edge;
b) means for defining with subpixel accuracy a desired edge position $x_k$ in the model intensity profile;
c) means for identifying the model intensity profile in the measured intensity profile with an indication of its location $x_m$ relative to a reference point; and
d) means for determining with subpixel accuracy the position p, referred to said reference point, of the edge to be measured, as $p=x_m+x_k$.

14. The measuring instrument as defined in claim 13, wherein the measurement stage (4) is configured as an open frame for receiving a transparent substrate (8), and there is provided below the measurement stage (4) a transmitted-light illumination device (15, 16) whose optical axis aligns with the optical axis of the incident illumination device (10, 13).

15. The measuring instrument as defined in claim 13, wherein the means for ascertaining and storing a model intensity profile, the means for defining a desired edge position $x_k$, the means for identifying the model intensity profile in the measured intensity profile, and the means for determining the position p of the edge to be measured, comprise at least one computer (29) and at least one computer program for carrying out the method steps as defined in claim 1.

16. A computer program product having program code means, which, in the context of a measuring instrument (6) for determining the position of an edge (7) to be measured of a pattern element on a substrate (8), controls and performs the following method steps a) ascertaining and storing a complete, nonlinear model intensity profile, which identifies the edge (7) to be measured, of a model edge;

b) defining with subpixel accuracy a desired model edge position $x_k$ in the model intensity profile;

c) acquiring a camera image, made up of pixel rows and pixel columns, of the edge (7) to be measured;

d) placing a rectangular measurement window onto the camera image transversely over the edge (7);

e) determining from the image signals of the pixels of the measurement window a one-dimensional measured intensity profile of the edge (7);

f) identifying the model intensity profile in the measured intensity profile with an indication of its location $x_m$ relative to a reference point; and g) determining with subpixel accuracy the position p, referred to said reference point, of the edge to be measured, as $p = x_m + x_k$ when the computer program is executed on a computer which is associated with the measuring instrument (6).

* * * * *